May 30, 1967

H. F. POLLOCK 3,322,529

PRODUCTION OF GRANULAR ALUMINUM

Filed Jan. 17, 1964

INVENTOR
Henry F. POLLOCK

ATTORNEY

May 30, 1967 H. F. POLLOCK 3,322,529
PRODUCTION OF GRANULAR ALUMINUM
Filed Jan. 17, 1964 4 Sheets-Sheet 2

INVENTOR
Henry F. POLLOCK
ATTORNEY

May 30, 1967 H. F. POLLOCK 3,322,529
PRODUCTION OF GRANULAR ALUMINUM
Filed Jan. 17, 1964 4 Sheets-Sheet 3

INVENTOR
Henry F. POLLOCK
ATTORNEY

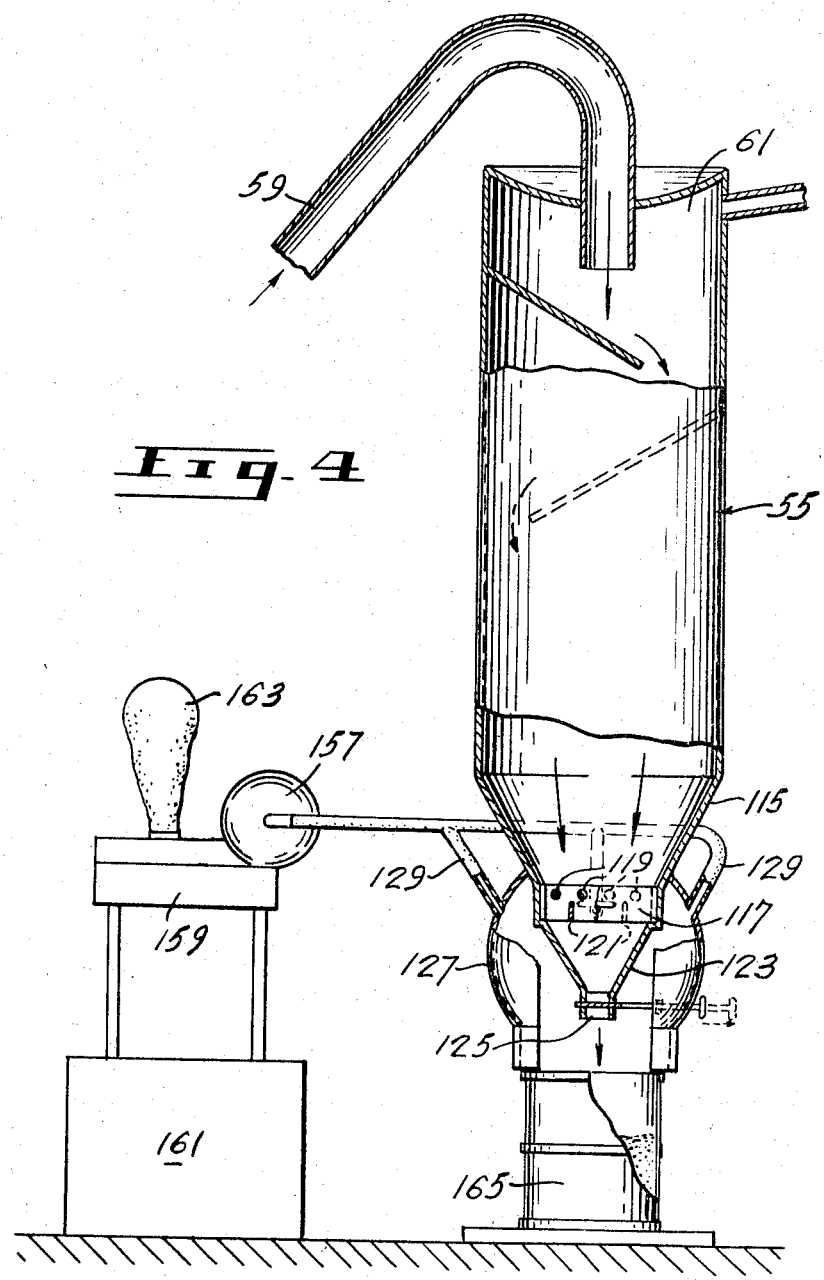

3,322,529
PRODUCTION OF GRANULAR ALUMINUM
Henry F. Pollock, 575 Carlyle Ave., Mount Royal, Quebec, Canada
Filed Jan. 17, 1964, Ser. No. 338,403
Claims priority, application Canada, Jan. 19, 1963, 866,974
5 Claims. (Cl. 75—.5)

This invention relates to the recovery of aluminum metal in finely divided form from aluminum foils.

The raw material for this process is waste or scrap aluminum foil, which is usually but not necessarily backed with a non-metallic material, such as paper, waxed paper or plastic and which may be uncoated, coated or lacquered. In some cases both surfaces of the aluminum foil are coated. The bulk of the supply of this material results from wastage in the manufacturing processes.

Previous attempts to recover the metal from such scrap by washing the backing material from the foil have been unsuccessful, and attempts have also been made to burn off the combustible backing material. Hitherto this procedure has either been mostly unsuccessful commercially or at best has resulted in the production of metal heavily contaminated with carbonaceous material and with metallic oxides resulting from the combustion of part of the metal itself. Pilot plants operating on these principles were abandoned because they indicated that the process was not workable commercially.

Procedures investigated prior to this invention were further complicated by the fact that batch processes were commonly employed. These involved costly preparation of the raw material by hand methods and the operating costs were further raised by the length of time (up to six hours) required to process each batch.

The present invention provides a practical process for recovering aluminum in granulated form from aluminum foil, which avoids the disadvantages of the prior methods and provides an improved product. In accordance with the invention, a mass of foil in small pieces is passed through a first combustion stage in which combustion is supported by burning combustible material from the foil itself. The foil, as recovered from packaging material etc., usually has to be shredded to reduce it to a mass of small pieces before it is fed to the first stage. In this first stage, the shredded foil is passed through a combustion zone under agitation so as to burn off extraneous material substantially completely while maintaining oxidation of the aluminum substantially at a minimum. The residence time of any given portion of the material is preferably between about 2 and about 3 minutes and the temperature is preferably within the range from about 800° F. to about 1100° F. The product resulting from this stage is aluminum in the form of wrinkled flakes having a thin layer of carbonaceous material. These flakes are milled to reduce their size and then passed, in the presence of air in excess of the amount needed to burn the carbon present, while being continuously agitated to expose fresh surfaces to the oxidizing influences of the air, through a second stage of heat treating in the presence of air in which the temperature is maintained by external heating within the range from about 950° F. to about 1050° F. preferably from about 975° F. to about 1025° F.

The residence time of any given portion of the material in this second heat treating stage is preferably from about 1 to about 2 minutes. In this second stage, residual carbonaceous material is removed while oxidation of the aluminum is maintained substantially at a minimum and the flakes are converted to granules.

Operating conditions are induced for both stages before the production run starts. This can be done by feeding aluminum foil carrying combustible material through the first stage under combustion conditions (using the resulting material for other purposes) until operating temperature has been reached. The second stage should be brought to operating temperature by external heating, before material is passed through it in a production run. A special cleaning step can also be employed in conjunction with the second stage. In this event the material leaving the heat treating zone is acted on to remove iron and to remove fines. This further upgrades the product, as will be described.

The product emerging from the second stage is granular aluminum which is clean and of uniform quality, chemically almost as pure as the metal in the scrap foil, and containing less than 0.5% of metallic oxides and other impurities. The physical form of the product is different from that of previous products. A good grade product, according to the invention, has an aluminum content of at least about 98%, often at least about 99%, and if a particularly clean starting material is employed, the aluminum content may be more than 99% with 99.3% not being unusual. These figures are by weight. It has a carbon content less than about 0.05%, hardly ever higher than 0.04%, and, in most cases, between about 0.02% and 0.03%. Such product has a particle size ranging downward from about 8 mesh and a bulk density from about 20 to about 70 pounds per cubic foot. The two-stage annealed aluminum of the invention has better mechanical grinding properties than the single-stage annealed granular aluminum resulting from prior processes. The product of the invention has a markedly greater surface area per unit of weight than granular aluminum produced by atomizing and is thus more reactive chemically. The product has a clean appearance.

The process lends itself particularly well to the recovery of aluminum from backed aluminum foil, but is also applicable to uncoated foil or foil containing other types of impurities. This product is well suited to grinding down to small mesh sizes; the annealing effect of the two-stage heat-treating process imparts the necessary physical properties and ductility to the metal.

The process is simple, economical, reliable and easily regulated. It can be conducted without losing more than about 3% to 5% of the weight of the metal charged.

The invention will be described in more detail by reference to preferred embodiments, shown in the accompanying drawings and in which FIGURE 1 is a diagrammatic side elevation showing a part of a plant in which the first combustion stage may be conducted.

FIGURE 4 is a side elevation, partly in section, showing preferred apparatus adapted to carry out the special cleaning step in conjunction with the second heat-treating stage.

Figure 1:
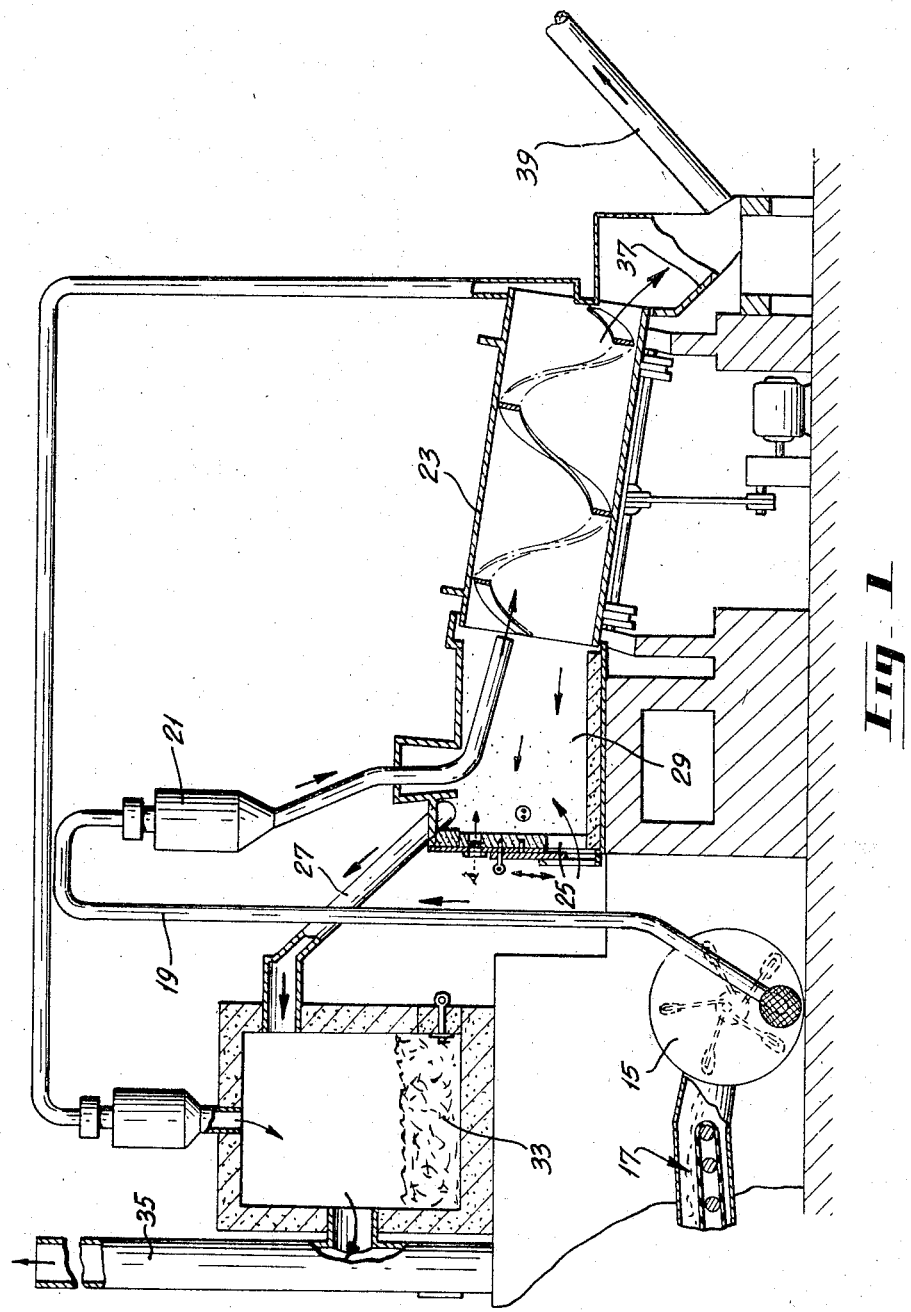
Figure 2:
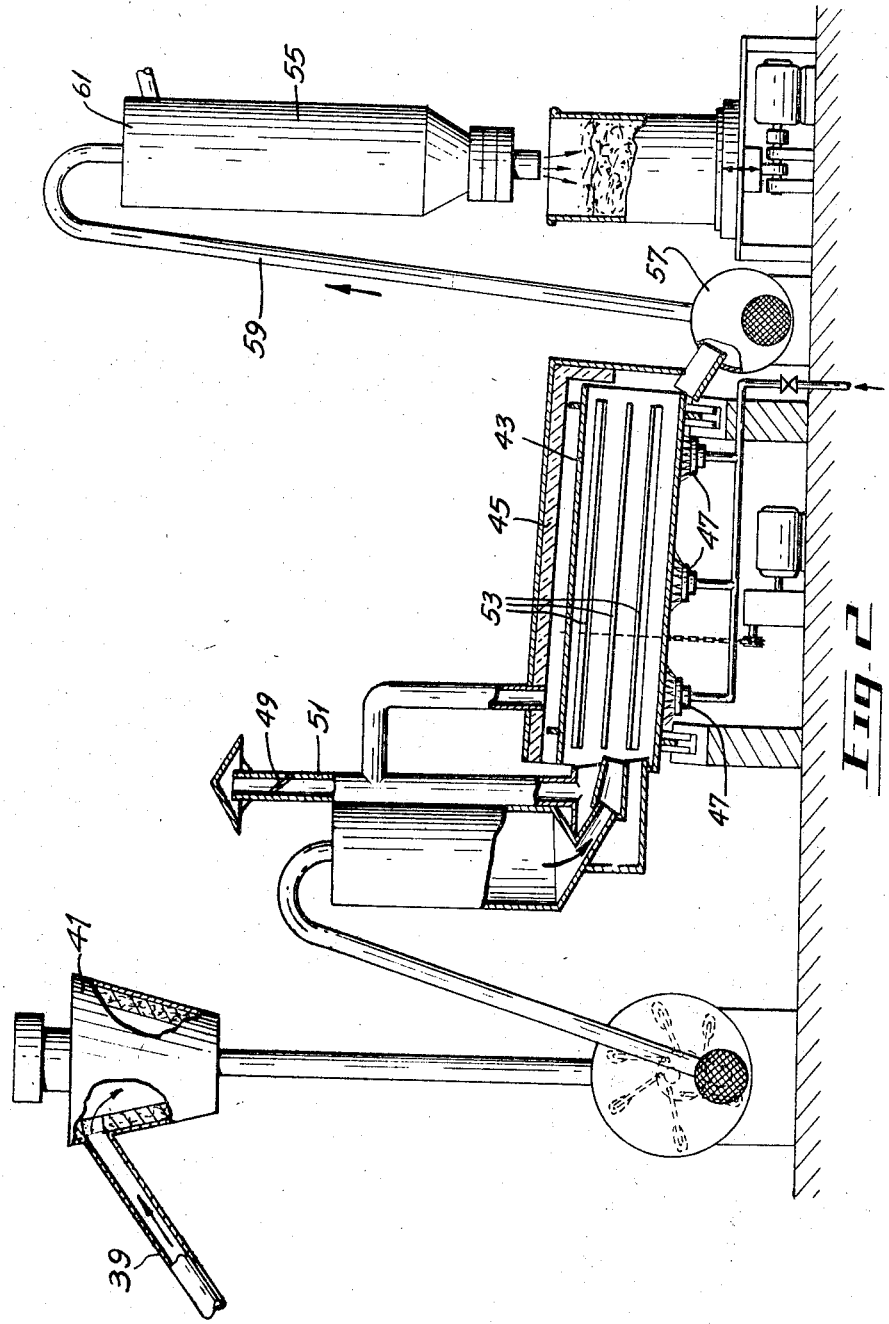
FIGURE 2 is a similar view of a second part of the plant in which the second combustion stage may be conducted.

The process is a two-stage controlled heat-treating operation, the first stage being illustrated in FIGURE 1 and the second stage in FIGURE 2.

The aluminum foil, as received from packaging material, etc. in bales, is first shredded in a hammer mill 15. This reduces it to a mass of small pieces preferably ranging from ½ to 1½ inches in length and from ½ to 1 inch in width. The foil from the bales is placed by hand on a conveyor belt 17 which feeds it into the mill 15. No grading or sorting with respect to quality or size is required. The rate of movement of the belt is controlled so that an excessive amount of foil cannot accidentally be introduced into the process, since an excessive charge rate causes overheating of the equipment and results in a poor quality product. The shredded foil is drawn from the hammer mill by a current of air in a pipe 19, and is passed through a cyclone separator 21 so that the shredded foil flows by gravity into the first combustion stage. The carrier air and any entrained dust escape to the atmosphere from the top of the cyclone 21. Air in the pipe 19 comes from the ventilator built in to the hammer mill 15, activated by the revolution of the rotor. The cyclone 21 does not of itself induce any draft.

The first combustion stage takes place in a brick-lined combustioned chamber 29 and a rotating, slightly inclined kiln 23, preferably of stainless steel. The higher end projects into the combustion chamber 29. The chamber 29 has an adjustable aperture 25 at its end, by adjustment of which the rate of flow of air through the kiln 23 may be controlled. The shredded foil flows by gravity through the hot combustion chamber 29 into the top part of the rotating kiln 23. Due to the high temperature, the combustible components of the foil, e.g. backing material, immediately catch fire. The natural draft through the flue pipe 27 causes a current of air to move through the kiln, counter-current with respect to the foil, and this cold air contacts the burning foil which is being spiralled towards the discharge end by rotation of the kiln.

The flow of air is adjusted by the draft control 25 is such a way that the burning foil is rapidly exposed to a relatively low ambient temperature, without any substantial portion being drawn backwards through the flue pipe 27 and lost into the settling chamber 33 or chimney stack 35. In this way only the combustible material is consumed and very little metal lost. Combustion is supported by the burning of combustible material from the foil.

The combustion chamber 29 heats up the foil waste pieces coming down through the stainless steel feeding tubes from the cyclone 21 and pre-heats and sears them before they are ignited in the kiln 23. Foil waste, because of its composition or lamination contains glue, color, sometimes plastic, Kraft paper, tissue paper, etc. It is normally not too easy to ignite. The pre-heating or searing conditions it to easy ignition, first by the propane gas torch, inserted for the purpose, then, once the feeding process continues, by continued self-ignition. The intense heat developed in the combustion chamber 29 under working conditions causes the necessary draft and counter-current as described.

It is believed that an extremely thin oxide film forms during the first combustion stage, sufficient to protect the metal from further oxidation during the short period in which it is exposed to a temperature in excess of 800° F. The material leaving the first combustion stage by the discharge chute 37 is in the form of a flat or slightly crinkled metallic flakes to which a thin layer of carbonaceous material still adheres, and this material does not burn readily. Since the product leaves the kiln at a temperature below 200° F., no protection of the product by inert gas or by handling in vacuo is required.

In the first combustion stage, the temperature at the inlet end of the kiln 23 is from about 800° F. to about 1100° F. preferably from about 925° F. to about 975° F. and at the discharge from about 100° F. to about 250° F. preferably from about 150° F. to about 225° F. In the combustion chamber 29, however, the temperature is higher, for example from about 1500° F. to about 1800° F.

The amount of air passing over the burning foil is controlled by adjusting the aperture 25. The temperature, the supply of air and the speed of progress of the material is regulated to burn off the combustibles while maintaining the oxidation of the metal substantially to a minimum, and to result in the provisions of the aluminum in the form of flakes. The temperature of these flakes on leaving the kiln 23 is between about 100° F. and about 150° F. If the conditions are not right, the operator can correct this by observing the product leaving the kiln. A dark product is a sign that there is too little combustion. If the flakes are grayish, almost like an oxide, this tells the operator that combustion is too vigorous.

The seed of rotation of the kiln 23 must be such as to give good burning while reducing burning-out and oxidation of the aluminum substantially to a minimum. If rotation is too fast the burning is incomplete. If too slow, the aluminum is burned out and oxidized. Rotation must be slow enough for the impurities and remnants of color to be substantially completely burned. Moreover, if the speed is too fast, the airstream does not have the capacity to carry the impurities away. If the rotational speed is too slow the aluminum burns and oxidizes.

The second stage, illustrated in FIGURE 2, removes most of the residual carbonaceous matter so that the carbon content of the final product is not more than about 0.05%. At the same time coloring material which may still remain on certain types of foil is removed.

This stage of the process is also a controlled combustion operation. The foil leaving the first stage by the transfer pipe 39 is fed through cyclone 41 into a second hammer mill which further reduces the size of the foil flakes. The material is then ready to be fed into the second stage. This stage employs a rotating stainless steel kiln 43, encased in a refractory-lined steel box 45 open at the bottom. The rotating kiln 43 is maintained at a temperature of 950° F. to 1050° F. preferably 975° F. to 1025° F. by external heating with gas burners 47. The temperature is automatically controlled. The rotation of the kiln 43 causes the aluminum flakes to move towards the discharge end, while the external heat supply causes a flow of air to move counter-current over the foil. The amount of air and hence the amount of available oxygen is controlled by a butterfly valve 49 on the hot air vent 51. A system of longitudinal baffles 53 in the kiln 43 has the effect of continually exposing fresh surfaces of the foil to the air as the kiln rotates. The baffles 53 are welded to the wall of the kiln 43 in a continuous row. The residual carbonaceous material is removed without any substantial oxidation of the metal taking place. Further, the temperature to which the metal is exposed causes the small flakes to shrivel into roughly spherical granules which impart a characteristic appearance and special properties.

The foil must be continuously agitated so that fresh surfaces are presented to the air, and this is achieved by rotation of the kiln and the action of the baffles. The temperature must be high enough to cause the carbon on these fresh surfaces to ignite, but not so high that the metal itself burns. The optimum temperature for this has been established as about 950° F. There must also be sufficient oxygen present to combine with all the carbon present, and it has been found best to operate with a constant fairly high air flow, and to exert control by regulating the temperature.

The operator controls the temperature is conjunction with the air supply, so that the material coming out is clear. Should the material emerging get grey, this is a sign that undue oxidation of the aluminum is taking place and that there is too much heat. If it comes out dark, combustion of the carbon is incomplete and adjustment of the temperature is required until the product coming out is clear. A dark product indicates that the temperature is too low. An ash-like grey powder is an indication that the temperature is too high. According to the invention, it is possible to adjust the temperature and the amount of air in such a way as to maintain appropriate conditions to get the clear porduct, which is what is wanted. Temperature control is exerted by appropriate adjustment of the burners.

In starting the process, it will be necessary to bring the respective combustion chambers to operating temperature before an actual production run is started. This can be done for example by burning low grade foil in the first stage until the desired temperature is reached. Working temperature in the second stage is attained by igniting the burners 47 and running them until the desired temperature is reached.

The product leaving the second stage contains a small proportion of paper ash, metallic oxides and inorganic dust such as silica. These impurities exist in the form of finely divided particles, and they are removed almost completely during transfer to the product storage cyclone silo 55, through a ventilator 57 and a transfer pipe 59. The product leaving the purification stage is picked up by a current of air and passed through a cyclone separator 61 located above the silo 55. The metal particles fall into the silo 55 while the impurities remain entrained in the air flow which leaves the separator 61. A typical composition of dust removed in this way is as follows.

|  | Percent |
|---|---|
| Combustible material | 7.2 |
| Aluminum | 5.0 |
| Aluminum oxide | 57.8 |
| Inorganic dust ($SiO_2$ etc.) | 30.0 |

In addition to the cleaning process just described, the material leaving the cyclone silo 55 may be subjected to a special cleaning step, now to be described, by reference to FIGURE 4. In accordance with this preferred modification, the tapered lower end 115 of the silo cyclone 55 is provided with a sliding drawer 117 having sides held together with cross bars 121 and including a number of magnetic cross bars 119. The drawer 117 is so mounted in the lower end of the part 115 that it can be pulled out to remove the iron collected by the magnets 119, and returned to position. Below the box 117 is a delivery nozzle 123, the lower end of which is provided with a sliding valve 125.

The lower end of the part 115 and the nozzle 123 is surrounded by a hood 127. Flexible conduits 129 lead from the hood to an exhaust fan 157 mounted on a table 159. Below the table 159 is a collection box 161 for fines (including dust, dirt and silica). Also mounted on the table 159 is a pressure release air bag 163 which has a conduit connection with the fan 157. Below the hood 127 is a receptacle 165 in the form of a drum or bag for receiving the cleaned material from the nozzle 123.

In operation, the material which has been cleaned by the silo cyclone 55 passes down past the magnets 119 which intercept magnetic material. The other material passes the magnets 119 and on down through the nozzle 123. When the material leaves the nozzle 123 it is acted on by the draft from the "Dustcop" fan 157 which removes the fines, while the heavier cleaned material gravitates into the receptacle 165.

The product leaving the second or purification stage exhibits a wide range of particle size. The mesh size ranges from −8 to dust. In certain applications this wide range is acceptable, but for most purposes, a narrower size range is desired. The size −40 to dust is one most frequently desired type, so a further or grinding stage may be employed to obtain the desired size range.

The grinding stage involves the mechanical grinding of the −8 to dust product. The ground material is passed through a series of mechanically shaken sieves in such a way that several products, graded as to particle size, may be produced simultaneously. The product is normally marketed in the following size ranges:

| | |
|---|---|
| Mesh to dust | −8 |
| Mesh to +100 mesh | −10 |
| Mesh to +100 mesh | −20 |
| Mesh to dust | −40 |
| Mesh to +60 mesh | −40 |
| Mesh to dust | −60 |
| Mesh to +100 mesh | −60 |
| Mesh to dust | −80 |
| Mesh to +100 mesh | −80 |
| Mesh to dust | −100 |

Figure 3:
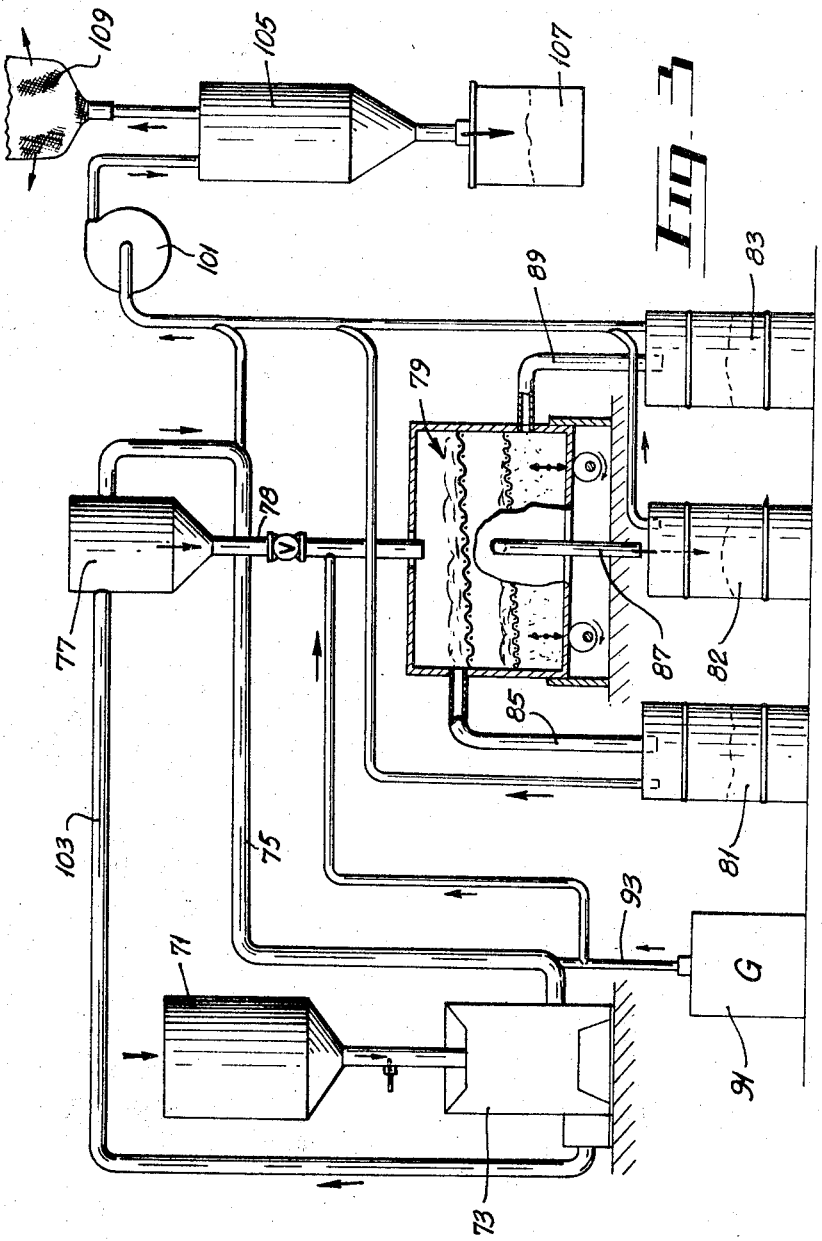
FIGURE 3 is a similar view showing an apparatus for grinding.

The grinding process is represented diagrammatically in FIGURE 3. The starting material, −8 to dust, is fed by means of a bucket elevator (not shown) into a silo 71. It flows by gravity into a hammer mill 73. The rate of flow is controlled by an adjustable orifice in the duct leading from the silo 71 into the hammer mill 73. The ground product is removed from the hammer mill 73 through the pipe 75 by a current of inert gas, and blown into a second silo 77 which incorporates a cyclone separator.

The ground product is allowed to flow at a controlled rate from the silo 77 through a pipe 78 and a connected series of mechanically shaken sieves 79. The number of sieve screens and the mesh sizes are determined by the grade or grades of product to be produced. The product retained on each sieve flows into the storage drums 81, 82 and 83, through respective pipes 85, 87 and 89. The first screen separates out any coarse product, which is recycled to the hammer mill to go through the grinding process a second time.

Because of the risk of explosion the grinding process is conducted in an inert atmosphere, maintained as follows. Before the process is put into operation an inert gas generator 91 is started up. This forces a stream of spent flue gas (natural gas burned in a "Maxon Pre-Mix" burner) the oxygen content of which is maintained below the lower explosive limit with respect to aluminum powder of 7%, through the pipe 93 and through the hammer mill 73 and cyclone separator 77. At the same time the sieve shaker 79 and storage drums 81, 82 and 83 are similarly purged. Only when this purging is completed is the grinding process put into operation.

In order to prevent the escape of aluminum dust into the atmosphere of the building in which these operations are conducted, an exhaust fan 101 withdraws a portion of the inert gas from the hammer mill circulating duct 103 and also from the storage drums. This gas flow passes through a cyclone separator 105 in which entrained dust is removed into a receiver 107 after which the inert gas escapes to the atmosphere through a filter bag 109. In this way, not only is the inert atmosphere maintained throughout the system, but the purity of the product is increased as it has been found that the dust removed from the receiver 107 on the inert gas system consists mainly of aluminum oxide, silica and other extraneous materials.

THE STARTING MATERIAL

The starting material consists of waste or scrap aluminum foil which may or may not be coated with paper, plastic, wax or lacquer. The foil may come from a variety of sources. Foil is used for such purposes as cigarette packaging, food packaging, labels for a wide range of products, decorative products, as wrapping paper, offcuts, misprints, holiday decorations and many others. The backing material may take many forms depending on the product being manufactured. In some cases, such as scrap from milk bottle cap manufacture, there may be very little paper or cardboard, whereas in food packaging applications a laminated foil may be used consisting of heavy layers of paper cardboard, glue, plastic and aluminum. After the hammer mill 15 there are larger and smaller pieces of waste, depending on the thickness and nature of the feeding material. Small trimmings, for instance, would give smaller sized paper pieces and thus smaller pieces would be discharged from kiln 23. These smaller pieces result in finer mesh sizes or "fines" being discharged by kiln 43. The proportion of smaller and larger pieces is governed by the nature of the feeding material.

THE END PRODUCT

The process of the invention produces an aluminum powder with a characteristic granular appearance, quite different from that of atomised aluminum powder as defined earlier. The particles are of irregular shape something like snowflakes with very ragged surfaces and thus have a much larger surface area per volume than atomized particles. This can be seen dramatically under the microscope even at magnifications of 100 times or even less. The granular structure results from the nature of the starting material and of the processing conditions. The flakes of metal foil resulting from the hammer mill treatment shrivel on exposure to heat to yield particles of roughly spherical shape.

Since the particles originate from thin foil the surface area per unit of weight is larger than is the case of atomized material, with a resultant increase in the chemical reactivity of the aluminum. This characteristic is also of value in the production of aluminum paints and pastes, since the product is more readily ground up by ball mill techniques.

The product also possesses a higher degree of ductility than atomized powder. This is believed to be imparted by the annealing effects of the heat treatment. The ductile nature of the product further facilitates grinding to smaller particle sizes either by ball mill or hammer mill.

A further advantageous property for certain explosive applications is the thin film on the metallic particles. In plastic explosives of the ammonal type, this oxide coating appears to reduce the chemical activity with the aluminum during storage, thus imparting a higher degree of storage stability to the explosive than before.

A typical explosive is made up of a mixture of aluminum, ammonium nitrate and sodium nitrate as active components. These are all solid powdered materials. To obtain the explosive in a form which can be handled and packaged conveniently the components are mixed with a starch-like material which, wetted with water, forms a plastic mass which can be packed into cylindrical containers. Some difficulties have been experienced in preserving the homogenous nature of the material, and it is suspected that deterioration is caused initially by reaction of the metallic aluminum to form aluminum nitrate.

Where the aluminum powder of the invention is used the stability of the explosive appears to be much better.

In order to illustrate further details of the invention, an example follows giving a preferred procedure.

*Example*

The equipment used was of the general nature shown in the drawings. The first stage kiln was 16 feet long by 36 inches in diameter rotating at a speed of about 13–16 r.p.m. and heated by burning combustible components of the charge. The second stage kiln was about 10 feet in length and about 1 foot in diameter. This kiln was heated by three gas burners.

First the kilns were brought to operating temperature as follows. The gas burners under the second stage kiln were lighted. A gas burner was put into the combustion chamber of the first stage kiln so as to warm the inside of this kiln. Shredded aluminum foil was then fed slowly into the first kiln and ignited by the gas burner. The combustible constituents of the foil was burned and the kiln thus brought to operating temperature. Until the operating temperature was reached, the combustion of the backing material was incomplete and unsatisfactory, and so the foil leaving the first and second stage kilns was collected as substandard. This material can be sold as low grade smelting material.

Once normal operating conditions had been established, a normal grade of paper-backed aluminum foil from belts was fed to the process over an 8-hour shift. This foil had an aluminum content of about 26% by weight and a non-aluminum content (i.e. paper and adhesive backing) of about 74% by weight. The foil was in the form of sheets measuring approximately 24 inches by 36 inches and strips of about 3 inches by four feet substantially free from dirt and other extraneous materials.

The sheets and strips of foil passed through the hammer mill, which reduced them to shreds measuring about one inch by one and one-half inches, was fed to the first combustion stage in which most of the backing was burned off. The temperature of the kiln was 1100° F. at the inlet end and 200° F. at the discharge end. The speed of rotation of the one inch diameter kiln was about 13–15 r.p.m. and the residence time of the foil in the kiln was approximately 90 seconds.

The foil leaving the first combustion stage had the following characteristics. The aluminum (non-coated) surface was bright and the reverse side from which the backing had been burned was coated with black carbonaceous matter. The weight of the foil including carbon was about 4339 pounds. This was made up of aluminum content (including $Al_2O_3$) about 58%, and the balance carbonaceous material. The loss of weight during the first combustion stage was about 5341 pounds or about 55.2% by weight.

The material just described from the first combustion stage was passed through a second hammer mill which reduced it to particles of about 8 mesh size. This material was fed into the second combustion stage, under the following conditions at about 542 pounds per hour. The temperature of the kiln was about 950° F. The rotational speed of the kiln was about 15 r.p.m. The residence time of any given quantity of material in the kiln was about 75 seconds.

The product leaving the second combustion stage was granular, and of clear, bright appearance. The particle size was less than 8 mesh. It had an $Al_2O_3$ content of about 0.60%, a $SiO_2$ content of about 0.30% and a carbon content of about 0.03%, all these figures being by weight. When the material leaving the silo is passed through the special cleaning step, as described above and shown in FIGURE 4, the quality of the product was further enhanced. It had an $Al_2O_3$ content of about 0.40%, and an $SiO_2$ content of about 0.15% and a carbon content of about 0.02%, all these figures being by weight.

In an 8 hour test run, at the average charging rate, of about 1210 pounds per hour, about 9680 pounds of paper-backed foil were consumed having an aluminum content of about 26% by weight. The total weight of the aluminum charged was about 2517 pounds (about 315 pounds per hour). The weight of the granular product recovered was about 2431 pounds, which corrected for $Al_2O_3$ content (removed air draft) of about 14 pounds, gave a net aluminum recovery of about 2417 pounds. The process losses were about 100 pounds or about 3.9 wt. percent.

The granular aluminum is clean and of uniform quality. It is chemically almost as pure as the scrap foil and contains less than about 0.5% of metallic oxides and other impurities.

The special dust removal step of FIGURE 4, following the silo 55, is of importance in obtaining the highest grade of final product. Using this step, the carbon content may be reduced to the lower levels described above. The silicon content (found in the $SiO_2$) caused by dust, sand and refractory material coming from the combustion chambers can be reduced to below about 0.15%. Without this special cleaning step, the silicon content can amount to about 0.25% and in some cases more.

I claim:
1. A process for recovering aluminum powder in finely divided free-flowing granular form from foil, comprising:
    (a) passing aluminum foil waste or scrap pieces and carrying extraneous combustible material through a combustion zone while agitating and burning it at a temperature within the range of about 800° F. to about 1100° F. thereby to continuously remove the major portion of the said extraneous material while annealing the aluminum and maintaining its oxidation substantially at a minimum and continuously removing the resulting mass from said zone,
    (b) reducing the size of the mass,

(c) then passing the reduced mass through an externally heated zone in the presence of air under continuous agitation at a temperature within the range from about 950° F. to about 1050° F. thereby to remove carbonaceous material and residual combustible material while further annealing the aluminum and maintaining its oxidation substantially at a minimum and providing it in the form of free-flowing granules adapted for grinding to smaller sizes.

2. A process, as defined in claim 1, in which the granules are mechanically ground to further reduce their size.

3. A process, as defined in claim 1, in which in the externally heated zone, the temperature is maintained within the range from about 975° F. to about 1025° F.

4. A process, as defined in claim 1, in which the residence time of the material in the combustion zone is from about two to about three minutes and in the externally heated zone from about one minute to about two minutes.

5. A process for preparing granular aluminum from a charge conesisting of waste or scrap aluminum foil backed with a non-metallic material such as paper, waxed paper or plastic comprising:

passing a charge of said aluminum foil waste or scrap pieces into a combustion zone having an entry end and an exit end;

igniting said pieces to create combustible conditions within the zone to burn the combustible backing off of foil subsequently charged thereto;

then continuously feeding additional pieces of said aluminum foil into the entry end of said zone and burning the combustible backing off of said pieces to maintain a temperature at the entry end of said zone between 800° F. and about 1100° F; producing pieces of aluminum foil having a carbon residue on at least a portion of their surfaces;

continuously removing the resulting mass from the exit end of said zone as soon as the major portion of the initially present non-metallic backing material is burned off the aluminum foil pieces leaving a carbon residue on said pieces, the exit end of said zone being at a temperature between about 100° F. and 250° F., oxidation of the aluminum during passage through said zone being held to a minimum;

passing said mass of foil with carbon residue thereon into and through an enclosed externally heated zone, heated to a temperature within the range from about 950° F. to about 1050° F. while continuously passing air into and through said enclosed zone thereby to burn off the remainder of the combustible components from the remaining aluminum;

removing the resulting products from said enclosed zone substantially as the combustible components are burned thereby to reduce oxidation of the aluminum substantially to a minimum; and recovering the resulting granular aluminum product.

References Cited

UNITED STATES PATENTS

| | | | |
|---|---|---|---|
| 1,869,886 | 8/1932 | Derr | 75—89 |
| 2,302,981 | 11/1942 | Stern | 75—68 |
| 2,678,880 | 5/1954 | Nuesch et al. | 75—0.5 |
| 2,793,027 | 5/1959 | Matthey | 266—5 |
| 2,950,184 | 8/1960 | Johnson | 75—.5 |
| 2,978,798 | 4/1961 | Wasserman et al. | 75—.5 |
| 3,119,684 | 1/1964 | Foerster | 75—.5 |

FOREIGN PATENTS

| | | |
|---|---|---|
| 2,477,796 | 8/1949 | Germany. |

HYLAND BIZOT, *Primary Examiner.*

DAVID L. RECK, *Examiner.*

N. F. MARKVA, W. W. STALLARD,
*Assistant Examiners.*